United States Patent
Govil

(10) Patent No.: US 8,988,409 B2
(45) Date of Patent: Mar. 24, 2015

(54) METHODS AND DEVICES FOR VOLTAGE REDUCTION FOR ACTIVE MATRIX DISPLAYS USING VARIABILITY OF PIXEL DEVICE CAPACITANCE

(75) Inventor: Alok Govil, Santa Clara, CA (US)

(73) Assignee: QUALCOMM MEMS Technologies, Inc., San Diego, CA (US)

( * ) Notice: Subject to any disclaimer, the term of this patent is extended or adjusted under 35 U.S.C. 154(b) by 796 days.

(21) Appl. No.: 13/189,428

(22) Filed: Jul. 22, 2011

(65) Prior Publication Data

US 2013/0021313 A1    Jan. 24, 2013

(51) Int. Cl.
*G09G 5/00* (2006.01)
*G02B 26/00* (2006.01)
*G09G 3/34* (2006.01)

(52) U.S. Cl.
CPC .............. *G02B 26/00* (2013.01); *G09G 3/3466* (2013.01); *G09G 2310/0251* (2013.01); *G09G 2300/0426* (2013.01); *G09G 2300/0842* (2013.01)
USPC .......................................... 345/212; 345/214

(58) Field of Classification Search
USPC ................................................ 345/211–215
See application file for complete search history.

(56) References Cited

U.S. PATENT DOCUMENTS

| | | | |
|---|---|---|---|
| 4,954,789 A | 9/1990 | Sampsell | |
| 5,784,189 A | 7/1998 | Bozler et al. | |
| 5,844,535 A | 12/1998 | Itoh et al. | |
| 5,966,111 A | 10/1999 | Koshoubu et al. | |
| 6,040,937 A | 3/2000 | Miles | |
| 6,327,071 B1 | 12/2001 | Kimura | |
| 6,574,033 B1 | 6/2003 | Chui et al. | |
| 6,674,562 B1 | 1/2004 | Miles et al. | |
| 7,042,643 B2 | 5/2006 | Miles | |
| 7,123,216 B1 | 10/2006 | Miles | |
| 7,327,510 B2 | 2/2008 | Cummings et al. | |
| 7,499,208 B2 | 3/2009 | Mignard | |
| 7,515,147 B2 | 4/2009 | Mignard | |
| 7,532,195 B2 | 5/2009 | Sampsell | |
| 7,545,550 B2 | 6/2009 | Gally et al. | |
| 7,560,299 B2 | 7/2009 | Cummings | |
| 7,889,163 B2 | 2/2011 | Chui et al. | |
| 7,990,604 B2 | 8/2011 | Lee et al. | |

(Continued)

FOREIGN PATENT DOCUMENTS

| | | |
|---|---|---|
| EP | 1473691 A2 | 11/2004 |
| WO | 9534986 A2 | 12/1995 |

(Continued)

OTHER PUBLICATIONS

International Search Report and Written Opinion—PCT/US2012/047206—ISA/EPO—Feb. 5, 2013.

(Continued)

*Primary Examiner* — Abbas Abdulselam
*Assistant Examiner* — Gerald Oliver
(74) *Attorney, Agent, or Firm* — Knobbe, Martens, Olson & Bear LLP

(57) ABSTRACT

Methods and devices for reducing the voltage required to update an array of display elements having variable capacitance are described herein. In one implementation, the method includes driving a display element to a first state using a reset drive line. The method further includes driving the display element to a second state using a column drive line. The capacitance of the display element is higher in the first state than in the second state.

32 Claims, 13 Drawing Sheets

(56) References Cited

U.S. PATENT DOCUMENTS

| | | |
|---|---|---|
| 2002/0012159 A1 | 1/2002 | Tew |
| 2002/0105509 A1 | 8/2002 | Johnson et al. |
| 2002/0140641 A1 | 10/2002 | Mikami et al. |
| 2003/0001813 A1 | 1/2003 | Sekiguchi |
| 2003/0016201 A1 | 1/2003 | Ayres et al. |
| 2004/0240138 A1 | 12/2004 | Martin et al. |
| 2005/0122560 A1 | 6/2005 | Sampsell et al. |
| 2006/0007217 A1 | 1/2006 | Kanbe et al. |
| 2006/0092122 A1 | 5/2006 | Yoshihara et al. |
| 2007/0075942 A1 | 4/2007 | Martin et al. |
| 2008/0231787 A1 | 9/2008 | Noguchi |
| 2009/0015579 A1* | 1/2009 | Nachman et al. ............ 345/212 |
| 2009/0033850 A1 | 2/2009 | Ishiguro et al. |
| 2009/0147343 A1 | 6/2009 | Kogut et al. |
| 2009/0153473 A1 | 6/2009 | Davis et al. |
| 2010/0245313 A1 | 9/2010 | Lewis et al. |
| 2010/0277406 A1 | 11/2010 | Choi et al. |
| 2011/0181802 A1 | 7/2011 | Wakimoto et al. |
| 2013/0021309 A1 | 1/2013 | Kothari et al. |

FOREIGN PATENT DOCUMENTS

| | | |
|---|---|---|
| WO | WO 03/007049 A1 | 1/2003 |
| WO | WO 03/073151 A1 | 9/2003 |
| WO | WO 2008/146263 | 12/2008 |
| WO | 2010111431 A2 | 9/2010 |

OTHER PUBLICATIONS

Landsburg, Drivers for Novel Displays, Information Display, 2002, 18(8):18-21.

Power Savings with Resonant PMLCD Driving, Journal of the Society for Information Display, 2002, 10(4):375-380.

Wang et al., Microcup® Electronic Paper and the Converting Processes, URL:http://www.sipix.com/technology/pub/pub_0018_2004.02.15_Xiaojia_ASID%20paper.English%20Translation.pdf.

* cited by examiner

METHODS AND DEVICES FOR VOLTAGE REDUCTION FOR ACTIVE MATRIX DISPLAYS USING VARIABILITY OF PIXEL DEVICE CAPACITANCE

TECHNICAL FIELD

This disclosure relates to reducing the energy consumption of an active matrix addressing scheme.

DESCRIPTION OF THE RELATED TECHNOLOGY

Electromechanical systems include devices having electrical and mechanical elements, actuators, transducers, sensors, optical components (e.g., mirrors) and electronics. Electromechanical systems can be manufactured at a variety of scales including, but not limited to, microscales and nanoscales. For example, microelectromechanical systems (MEMS) devices can include structures having sizes ranging from about a micron to hundreds of microns or more. Nanoelectromechanical systems (NEMS) devices can include structures having sizes smaller than a micron including, for example, sizes smaller than several hundred nanometers. Electromechanical elements may be created using deposition, etching, lithography, and/or other micromachining processes that etch away parts of substrates and/or deposited material layers, or that add layers to form electrical and electromechanical devices.

One type of electromechanical systems device is called an interferometric modulator (IMOD). As used herein, the term interferometric modulator or interferometric light modulator refers to a device that selectively absorbs and/or reflects light using the principles of optical interference. In some implementations, an interferometric modulator may include a pair of conductive plates, one or both of which may be transparent and/or reflective, wholly or in part, and capable of relative motion upon application of an appropriate electrical signal. In an implementation, one plate may include a stationary layer deposited on a substrate and the other plate may include a reflective membrane separated from the stationary layer by an air gap. The position of one plate in relation to another can change the optical interference of light incident on the interferometric modulator. Interferometric modulator devices have a wide range of applications, and are anticipated to be used in improving existing products and creating new products, especially those with display capabilities.

SUMMARY

The systems, methods and devices of the disclosure each have several innovative aspects, no single one of which is solely responsible for the desirable attributes disclosed herein.

One innovative aspect of the subject matter described in this disclosure can be implemented in an apparatus including at least one display element having a plurality of states, each of the states corresponding to one of a plurality of charge levels applied to the at least one display element. The plurality of states includes a first state and a second state, wherein the capacitance of the display element is higher in the first state than in the second state. The apparatus further includes a drive switch coupling the at least one display element to a drive voltage line when addressed by a drive address line. The apparatus further includes a reset switch coupling the at least one display element to a reset voltage line when addressed by a reset address line. The reset voltage line is configured to set the at least one display element to the first state when coupled to the at least one display element.

In another innovative aspect, a method of updating an array including at least one display element is provided. The method includes coupling the at least one display element to a reset voltage line, the at least one display element having at least a first and a second state, wherein the capacitance of the at least one display element is higher in the first state than in the second state. The method further includes setting the at least one display element to the first state. The method further includes decoupling the at least one display element from the reset voltage line. The method further includes coupling the at least one display element to a drive voltage line. The method further includes driving the at least one display element to the second state.

In another innovative aspect, a method of updating an array including at least one row of display elements is provided. The method includes pre-charging at least one row of display elements with a reset voltage, the display elements of the at least one row having at least a first and a second state, wherein the capacitance of the display elements of the at least one row is higher in the first state than in the second state. The method further includes waiting for at least some of the display elements in the at least one row of display elements to reach the first state. The method further includes charging the at least one row of display elements with a drive voltage. The method further includes waiting for at least some of the display elements in the at least one row of display elements to reach the second state.

In another innovative aspect, an apparatus is provided. The apparatus includes at least one display element having a plurality of states, each of the states corresponding to one of a plurality of charge levels applied to the at least one display element, the plurality of states including a least a first state and a second state, wherein the capacitance of the display element is higher in the first state than in the second state. The apparatus further includes means for coupling the at least one display element to a drive voltage line when addressed by a drive address line. The apparatus further includes means for coupling the at least one display element to a reset voltage line. The apparatus further includes means for setting the at least one display element to the first state.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1A:
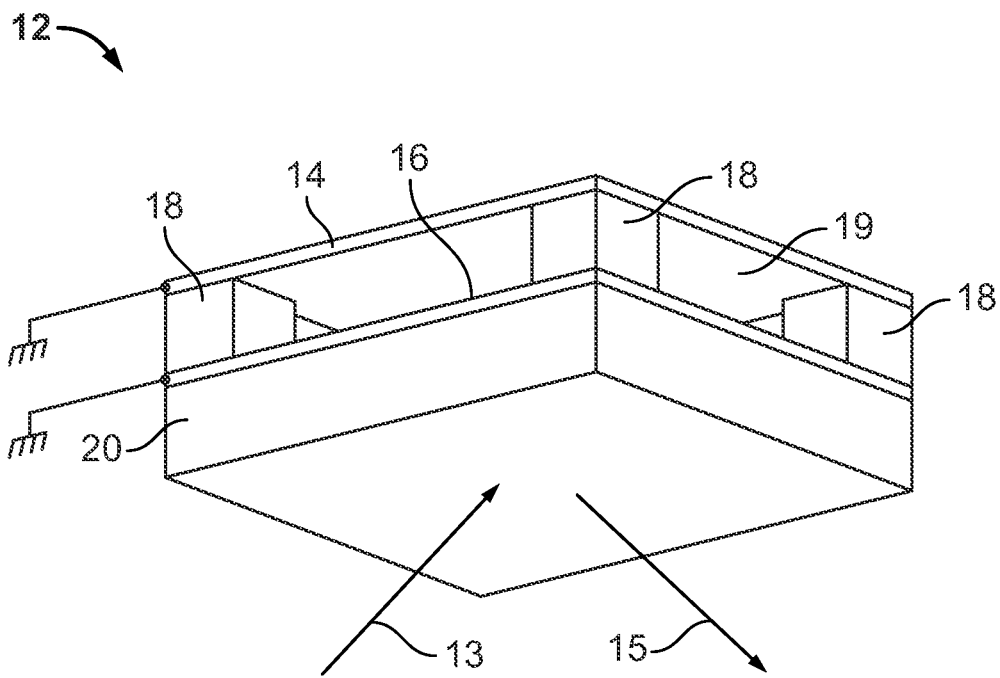
FIGS. 1A and 1B show examples of isometric views depicting a pixel of an interferometric modulator (IMOD) display device in two different states.

The following detailed description is directed to certain implementations for the purposes of describing the innovative aspects. However, the teachings herein can be applied in a multitude of different ways. The described implementations may be implemented in any device that is configured to display an image, whether in motion (e.g., video) or stationary (e.g., still image), and whether textual, graphical or pictorial. More particularly, it is contemplated that the implementations may be implemented in or associated with a variety of electronic devices such as, but not limited to, mobile telephones, multimedia Internet enabled cellular telephones, mobile television receivers, wireless devices, smartphones, bluetooth devices, personal data assistants (PDAs), wireless electronic mail receivers, hand-held or portable computers, netbooks, notebooks, smartbooks, printers, copiers, scanners, facsimile devices, GPS receivers/navigators, cameras, MP3 players, camcorders, game consoles, wrist watches, clocks, calculators, television monitors, flat panel displays, electronic reading devices (e.g., e-readers), computer monitors, auto displays (e.g., odometer display, etc.), cockpit controls and/or displays, camera view displays (e.g., display of a rear view camera in a vehicle), electronic photographs, electronic billboards or signs, projectors, architectural structures, microwaves, refrigerators, stereo systems, cassette recorders or players, DVD players, CD players, VCRs, radios, portable memory chips, washers, dryers, washer/dryers, parking meters, packaging (e.g., electromechanical systems (EMS), MEMS and non-MEMS), aesthetic structures (e.g., display of images on a piece of jewelry) and a variety of electromechanical systems devices. The teachings herein also can be used in non-display applications such as, but not limited to, electronic switching devices, radio frequency filters, sensors, accelerometers, gyroscopes, motion-sensing devices, magnetometers, inertial components for consumer electronics, parts of consumer electronics products, varactors, liquid crystal devices, electrophoretic devices, drive schemes, manufacturing processes, and electronic test equipment. Thus, the teachings are not intended to be limited to the implementations depicted solely in the Figures, but instead have wide applicability as will be readily apparent to a person having ordinary skill in the art.

Devices and methods are described herein relate to display elements that are reset to a high capacitance state prior to writing the desired data to the display element. Power dissipation of displays is typically dominated by the power required to drive the data lines while the power used to drive the gates on the row lines is much less. The main reason for this is that the power to drive the data lines includes an extra multiplicative factor of the number of rows. Display devices and associated methods described below reduce the power required to drive the data lines by setting the state of the display elements to a high capacitance state prior to driving the data lines. This incurs a cost of additional power dissipated by the row driving process. The added row dissipation is however much less than the reduction in data line dissipation, for an overall improvement in efficiency.

One interferometric modulator display implementation including an interferometric MEMS display element is illustrated in FIG. 1. In these devices, the pixels are in either a bright or dark state. In the bright ("relaxed" or "open") state, the display element reflects a large portion of incident visible light to a user. When in the dark ("actuated" or "closed") state, the display element reflects little incident visible light to the user. Depending on the implementation, the light reflectance properties of the "on" and "off" states may be reversed. MEMS pixels can be configured to reflect predominantly at selected colors, allowing for a color display in addition to black and white.

An example of a suitable MEMS device, to which the described implementations may apply, is a reflective display device. Reflective display devices can incorporate interferometric modulators (IMODs) to selectively absorb and/or reflect light incident thereon using principles of optical interference. IMODs can include an absorber, a reflector that is movable with respect to the absorber, and an optical resonant cavity defined between the absorber and the reflector. The reflector can be moved to two or more different positions, which can change the size of the optical resonant cavity and thereby affect the reflectance of the interferometric modulator. The reflectance spectrums of IMODs can create fairly broad spectral bands which can be shifted across the visible wavelengths to generate different colors. The position of the spectral band can be adjusted by changing the thickness of the optical resonant cavity, i.e., by changing the position of the reflector.

Figure 1B:
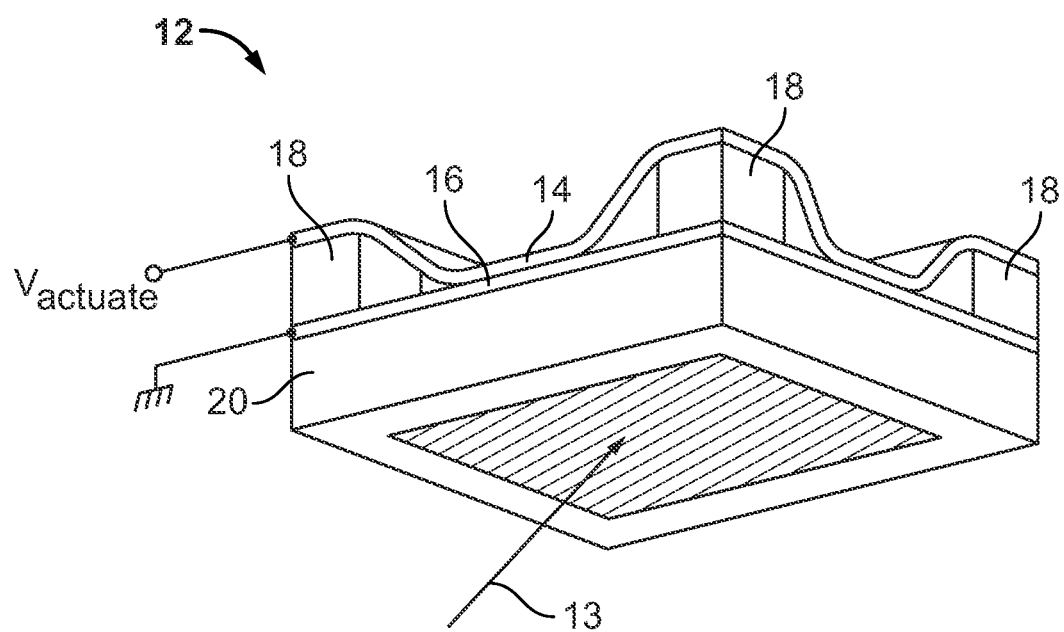

FIGS. 1A and 1B show examples of isometric views depicting a pixel of an interferometric modulator (IMOD) display device in two different states. The IMOD display device includes one or more interferometric MEMS display elements. In these devices, the pixels of the MEMS display elements can be in either a bright or dark state. In the bright ("relaxed," "open" or "on") state, the display element reflects a large portion of incident visible light, e.g., to a user. Conversely, in the dark ("actuated," "closed" or "off") state, the display element reflects little incident visible light. In some implementations, the light reflectance properties of the on and off states may be reversed. MEMS pixels can be configured to reflect predominantly at particular wavelengths allowing for a color display in addition to black and white.

The IMOD display device can include a row/column array of IMODs. Each IMOD can include a pair of reflective layers, i.e., a movable reflective layer and a fixed partially reflective layer, positioned at a variable and controllable distance from each other to form an air gap (also referred to as an optical gap or cavity). The movable reflective layer may be moved between at least two positions. In a first position, i.e., a relaxed position, the movable reflective layer can be positioned at a relatively large distance from the fixed partially reflective layer. In a second position, i.e., an actuated position, the movable reflective layer can be positioned more closely to the partially reflective layer. Incident light that reflects from the two layers can interfere constructively or destructively depending on the position of the movable reflective layer, producing either an overall reflective or non-reflective state for each pixel. In some implementations, the IMOD may be in a reflective state when unactuated, reflecting light within the visible spectrum, and may be in a dark state when unactuated, reflecting light outside of the visible range (e.g., infrared light). In some other implementations, however, an IMOD may be in a dark state when unactuated, and in a reflective state when actuated. In some implementations, the introduction of an applied voltage can drive the pixels to change states. In some other implementations, an applied charge can drive the pixels to change states.

The depicted pixels in FIGS. 1A and 1B depict two different states of an IMOD 12. In the IMOD 12 in FIG. 1A, a movable reflective layer 14 is illustrated in a relaxed position at a predetermined (e.g., designed) distance from an optical stack 16, which includes a partially reflective layer. Since no voltage is applied across the IMOD 12 in FIG. 1A, the movable reflective layer 14 remained in a relaxed or unactuated state. In the IMOD 12 in FIG. 1B, the movable reflective layer 14 is illustrated in an actuated position and adjacent, or nearly adjacent, to the optical stack 16. The voltage $V_{actuate}$ applied across the IMOD 12 in FIG. 1B is sufficient to actuate the movable reflective layer 14 to an actuated position.

In FIGS. 1A and 1B, the reflective properties of pixels 12 are generally illustrated with arrows 13 indicating light incident upon the pixels 12, and light 15 reflecting from the pixel 12 on the left. Although not illustrated in detail, it will be understood by a person having ordinary skill in the art that most of the light 13 incident upon the pixels 12 will be transmitted through the transparent substrate 20, toward the optical stack 16. A portion of the light incident upon the optical stack 16 will be transmitted through the partially reflective layer of the optical stack 16, and a portion will be reflected back through the transparent substrate 20. The portion of light 13 that is transmitted through the optical stack 16 will be reflected at the movable reflective layer 14, back toward (and through) the transparent substrate 20. Interference (constructive or destructive) between the light reflected from the partially reflective layer of the optical stack 16 and the light reflected from the movable reflective layer 14 will determine the wavelength(s) of light 15 reflected from the pixels 12.

The optical stack 16 can include a single layer or several layers. The layer(s) can include one or more of an electrode layer, a partially reflective and partially transmissive layer and a transparent dielectric layer. In some implementations, the optical stack 16 is electrically conductive, partially transparent and partially reflective, and may be fabricated, for example, by depositing one or more of the above layers onto a transparent substrate 20. The electrode layer can be formed from a variety of materials, such as various metals, for example indium tin oxide (ITO). The partially reflective layer can be formed from a variety of materials that are partially reflective, such as various metals, e.g., chromium (Cr), semiconductors, and dielectrics. The partially reflective layer can be formed of one or more layers of materials, and each of the layers can be formed of a single material or a combination of materials. In some implementations, the optical stack 16 can include a single semi-transparent thickness of metal or semiconductor which serves as both an optical absorber and conductor, while different, more conductive layers or portions (e.g., of the optical stack 16 or of other structures of the IMOD) can serve to bus signals between IMOD pixels. The optical stack 16 also can include one or more insulating or dielectric layers covering one or more conductive layers or a conductive/absorptive layer.

In some implementations, the optical stack 16, or lower electrode, is grounded at each pixel. In some implementations, this may be accomplished by depositing a continuous optical stack 16 onto the substrate 20 and grounding at least a portion of the continuous optical stack 16 at the periphery of the deposited layers. In some implementations, a highly conductive and reflective material, such as aluminum (Al), may be used for the movable reflective layer 14. The movable reflective layer 14 may be formed as a metal layer or layers deposited on top of posts 18 and an intervening sacrificial material deposited between the posts 18. When the sacrificial material is etched away, a defined gap 19, or optical cavity, can be formed between the movable reflective layer 14 and the optical stack 16. In some implementations, the spacing between posts 18 may be approximately of 1-1000 um, while the gap 19 may be less than or equal to approximately 10,000 Angstroms (Å).

In some implementations, each pixel of the IMOD, whether in the actuated or relaxed state, is essentially a capacitor formed by the fixed and moving reflective layers. When no voltage is applied, the movable reflective layer 14a remains in a mechanically relaxed state, as illustrated by the pixel 12 in FIG. 1A, with the gap 19 between the movable reflective layer 14 and optical stack 16. However, when a potential difference, e.g., voltage, is applied to at least one of the movable reflective layer 14 and optical stack 16, the capacitor formed at the corresponding pixel becomes charged, and electrostatic forces pull the electrodes together. If the applied voltage exceeds a threshold, the movable reflective layer 14 can deform and move near or against the optical stack 16. A dielectric layer (not shown) within the optical stack 16 may prevent shorting and control the separation distance between the layers 14 and 16, as illustrated by the actuated pixel 12 in FIG. 1B. The behavior is the same regardless of the polarity of the applied potential difference. Though a series of pixels in an array may be referred to in some instances as "rows" or "columns," a person having ordinary skill in the art will readily understand that referring to one direction as a "row" and another as a "column" is arbitrary. Restated, in some orientations, the rows can be considered columns, and the columns considered to be rows. Furthermore, the display elements may be evenly arranged in orthogonal rows and columns (an "array"), or arranged in non-linear configurations, for example, having certain positional offsets with respect to one another (a "mosaic"). The terms "array" and "mosaic" may refer to either configuration. Thus, although the display is referred to as including an "array" or "mosaic," the elements themselves need not be arranged orthogonally to one another, or disposed in an even distribution, in any instance, but may include arrangements having asymmetric shapes and unevenly distributed elements.

In some implementations, such as in a series or array of IMODs, the optical stacks 16 can serve as a common electrode that provides a common voltage to one side of the IMODs 12. The movable reflective layers 14 may be formed as an array of separate plates arranged in, for example, a matrix form. The separate plates can be supplied with voltage signals for driving the IMODs 12.

Figure 3:
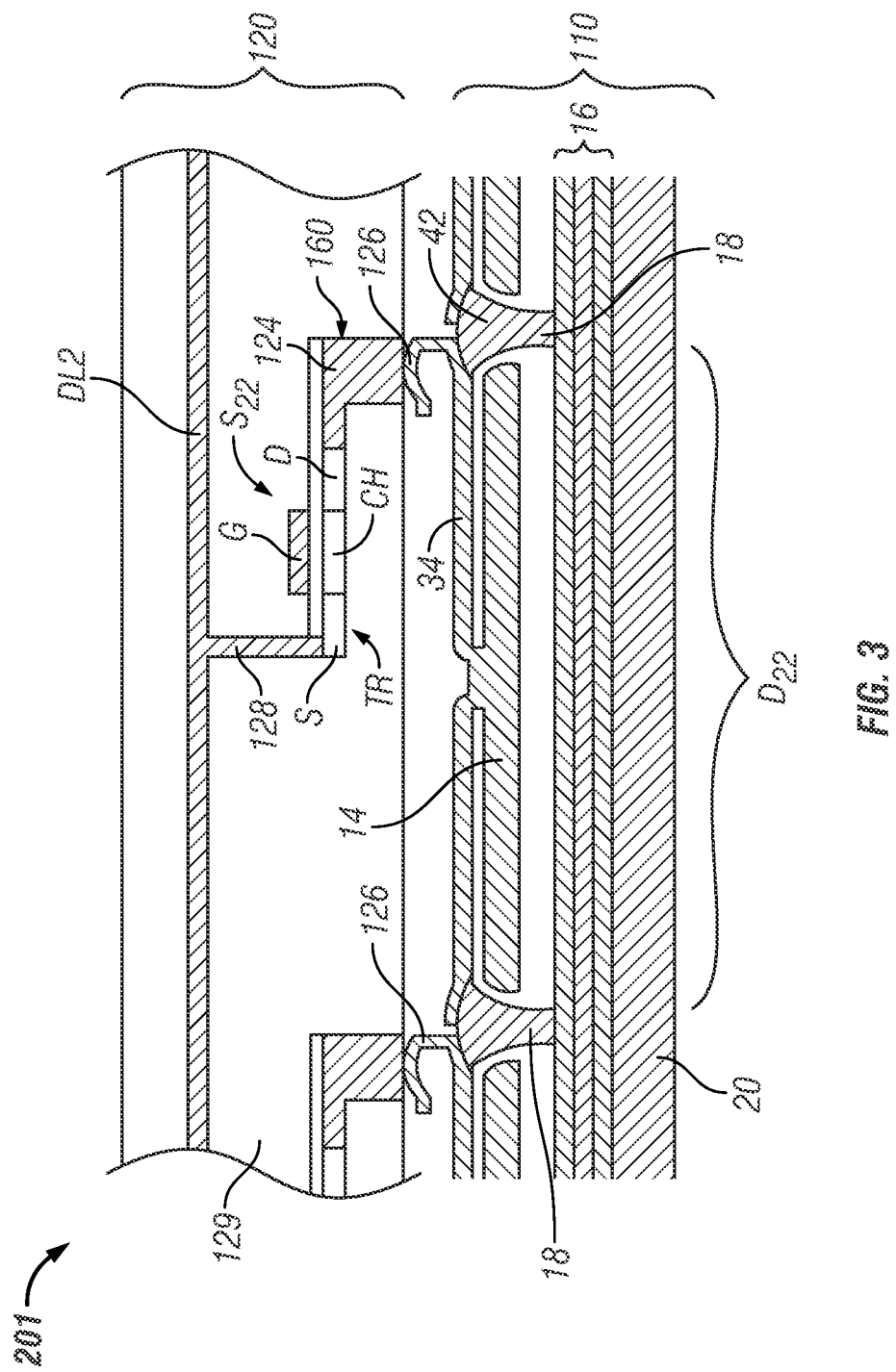
FIG. 3 is an example of a schematic partial cross-section illustrating one implementation of the structure of the driving circuit and the associated display element of FIG. 2.

The details of the structure of interferometric modulators that operate in accordance with the principles set forth above may vary widely. For example, the movable reflective layers 14 of each IMOD 12 may be attached to supports at the corners only, e.g., on tethers. As shown in FIG. 3, a flat, relatively rigid movable reflective layer 14 may be suspended from a deformable layer 34, which may be formed from a flexible metal. This architecture allows the structural design and materials used for the electromechanical aspects and the optical aspects of the modulator to be selected, and to function, independently of each other. Thus, the structural design and materials used for the movable reflective layer 14 can be optimized with respect to the optical properties, and the structural design and materials used for the deformable layer 34 can be optimized with respect to desired mechanical properties. For example, the movable reflective layer 14 portion may be aluminum, and the deformable layer 34 portion may be nickel. The deformable layer 34 may connect, directly or indirectly, to the substrate 20 around the perimeter of the deformable layer 34. These connections may form the support posts 18.

In implementations such as those shown in FIGS. 1A and 1B, the IMODs function as direct-view devices, in which images are viewed from the front side of the transparent substrate 20, i.e., the side opposite to that upon which the modulator is arranged. In these implementations, the back portions of the device (that is, any portion of the display device behind the movable reflective layer 14, including, for example, the deformable layer 34 illustrated in FIG. 3) can be configured and operated upon without impacting or negatively affecting the image quality of the display device, because the reflective layer 14 optically shields those portions of the device. For example, in some implementations a bus structure (not illustrated) can be included behind the movable reflective layer 14 which provides the ability to separate the optical properties of the modulator from the electromechanical properties of the modulator, such as voltage addressing and the movements that result from such addressing.

Figure 2:
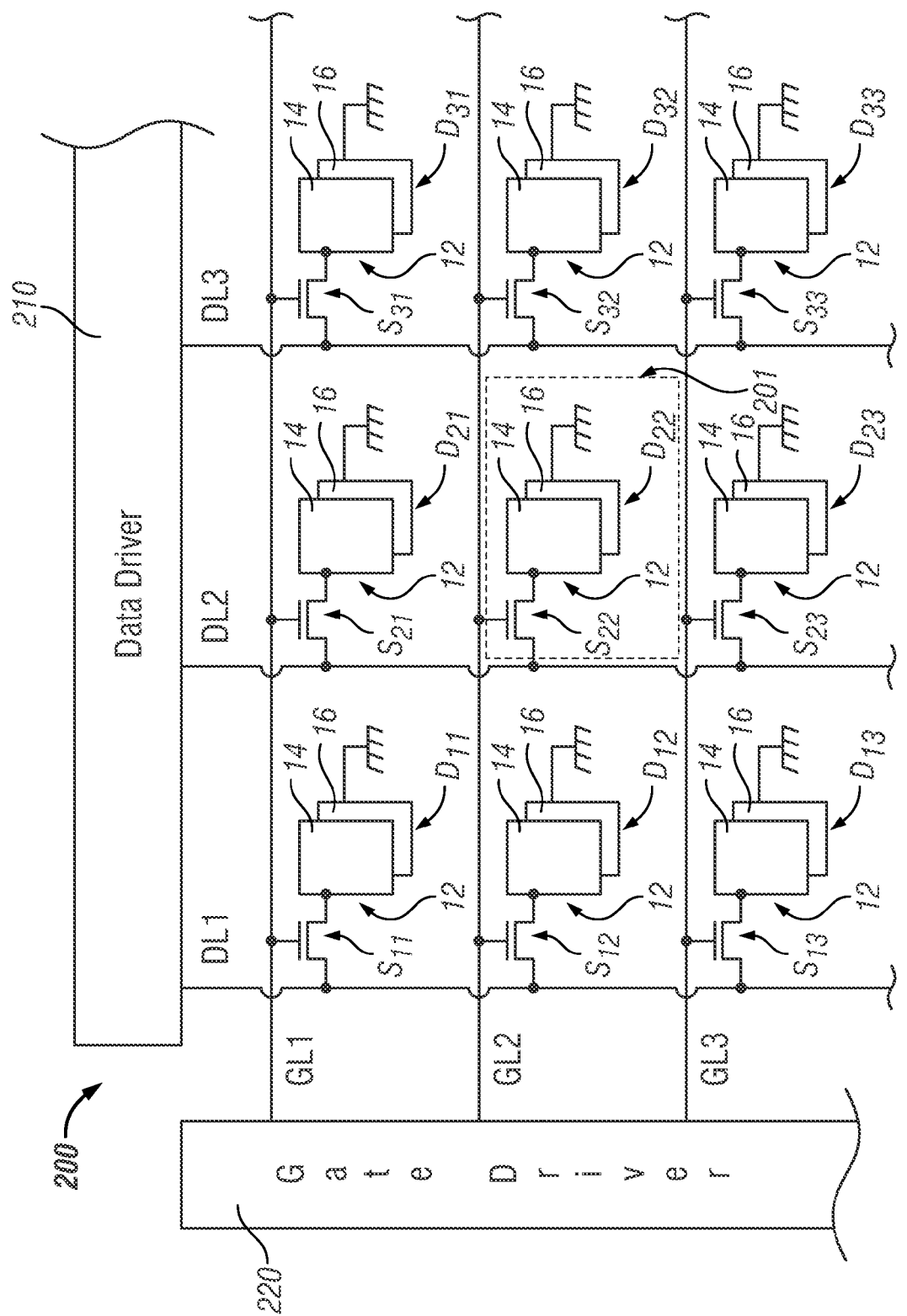
FIG. 2 shows an example of a schematic circuit diagram illustrating a driving circuit array for an optical MEMS display device.

FIG. 2 shows an example of a schematic circuit diagram illustrating a driving circuit array 200 for an optical MEMS display device. The driving circuit array 200 can be used for implementing an active matrix addressing scheme for providing image data to display elements $D_{11}$-$D_{mn}$ of a display array assembly.

The driving circuit array 200 includes a data driver 210, a gate driver 220, first to m-th data lines DL1-DLm, first to n-th gate lines GL1-GLn, and an array of switches or switching circuits $S_{11}$-$S_{mn}$. Each of the data lines DL1-DLm extends from the data driver 210, and is electrically connected to a respective column of switches $S_{11}$-$S_{1n}$, $S_{21}$-$S_{2n}$, ..., $S_{m1}$-$S_{mn}$. Each of the gate lines GL1-GLn extends from the gate driver 220, and is electrically connected to a respective row of switches $S_{11}$-$S_{m1}$, $S_{12}$-$S_{m2}$, ..., $S_{1n}$-$S_{mn}$. The switches $S_{11}$-$S_{mn}$ are electrically coupled between one of the data lines DL1-DLm and a respective one of the display elements $D_{11}$-$D_{mn}$ and receive a switching control signal from the gate driver 220 via one of the gate lines GL1-GLn. The switches $S_{11}$-$S_{mn}$ are illustrated as single FET transistors, but may take a variety of forms such as two transistor transmission gates (for current flow in both directions) or even mechanical MEMS switches.

The data driver 210 can receive image data from outside the display, and can provide the image data on a row by row basis in a form of voltage signals to the switches $S_1$-$S_{mn}$ via the data lines DL1-DLm. The gate driver 220 can select a particular row of display elements $D_{11}$-$D_{m1}$, $D_{12}$-$D_{m2}$, ..., $D_{1n}$-$D_{mn}$ by turning on the switches $S_{11}$-$S_{m1}$, $S_{12}$-$S_{m2}$, ..., $S_{1n}$-$S_{mn}$ associated with the selected row of display elements $D_{11}$-$D_{m1}$, $D_{12}$-$D_{m2}$, ..., $D_{1n}$-$D_{mn}$. When the switches $S_{11}$-$S_{m1}$, $S_{12}$-$S_{m2}$, ..., $S_{1n}$-$S_{mn}$ in the selected row are turned on, the image data from the data driver 210 is passed to the selected row of display elements $D_{11}$-$D_{m1}$, $D_{12}$-$D_{m2}$, ..., $D_{1n}$-$D_{mn}$.

During operation, the gate driver 220 can provide a voltage signal via one of the gate lines GL1-GLn to the gates of the switches $S_{11}$-$S_{mn}$ in a selected row, thereby turning on the switches $S_{11}$-$S_{mn}$. After the data driver 210 provides image data to all of the data lines DL1-DLm, the switches $S_{11}$-$S_{mn}$ of the selected row can be turned on to provide the image data to the selected row of display elements $D_{11}$-$D_{m1}$, $D_{12}$-$D_{m2}$, ..., $D_{1n}$-$D_{mn}$, thereby displaying a portion of an image. For example, data lines DL that are associated with pixels that are to be actuated in the row can be set to, e.g., 10-volts (could be positive or negative), and data lines DL that are associated with pixels that are to be released in the row can be set to, e.g., 0-volts. Then, the gate line GL for the given row is asserted, turning the switches in that row on, and applying the selected data line voltage to each pixel of that row. This charges and actuates the pixels that have 10-volts applied, and discharges and releases the pixels that have 0-volts applied. Then, the switches $S_{11}$-$S_{mn}$ can be turned off. The display elements $D_{11}$-$D_{m1}$, $D_{12}$-$D_{m2}$, ..., $D_{1n}$-$D_{mn}$ can hold the image data because the charge on the actuated pixels will be retained when the switches are off, except for some leakage through insulators and the off state switch. Generally, this leakage is low enough to retain the image data on the pixels until another set of data is written to the row. These steps can be repeated to each succeeding row until all of the rows have been selected and image data has been provided thereto. In the implementation of FIG. 2, the optical stack 16 is grounded at each pixel. In some implementations, this may be accomplished by depositing a continuous optical stack 16 onto the substrate and grounding the entire sheet at the periphery of the deposited layers.

FIG. 3 is an example of a schematic partial cross-section illustrating one implementation of the structure of the driving circuit and the associated display element of FIG. 2. A portion 201 of the driving circuit array 200 includes the switch $S_{22}$ at the second column and the second row, and the associated display element $D_{22}$. In the illustrated implementation, the switch $S_{22}$ includes a transistor 80. Other switches in the driving circuit array 200 can have the same configuration as the switch $S_{22}$, or can be configured differently, for example by changing the structure, the polarity, or the material.

FIG. 3 also includes a portion of a display array assembly 110, and a portion of a backplate 120. The portion of the display array assembly 110 includes the display element $D_{22}$ of FIG. 2. The display element $D_{22}$ includes a portion of a front substrate 20, a portion of an optical stack 16 formed on the front substrate 20, supports 18 formed on the optical stack 16, a movable reflective layer 14 (or a movable electrode connected to a deformable layer 34) supported by the supports 18, and an interconnect 126 electrically connecting the movable reflective layer 14 to one or more components of the backplate 120.

The portion of the backplate 120 includes the second data line DL2 and the switch $S_{22}$ of FIG. 2, which are embedded in the backplate 120. The portion of the backplate 120 also includes a first interconnect 128 and a second interconnect 124 at least partially embedded therein. The second data line DL2 extends substantially horizontally through the backplate 120. The switch $S_{22}$ includes a transistor 80 that has a source 82, a drain 84, a channel 86 between the source 82 and the drain 84, and a gate 88 overlying the channel 86. The transistor 80 can be, e.g., a thin film transistor (TFT) or metal-oxidesemiconductor field effect transistor (MOSFET). The gate of the transistor 80 can be formed by gate line GL2 extending through the backplate 120 perpendicular to data line DL2. The first interconnect 128 electrically couples the second data line DL2 to the source 82 of the transistor 80.

The transistor 80 is coupled to the display element $D_{22}$ through one or more vias 160 through the backplate 120. The vias 160 are filled with conductive material to provide electrical connection between components (for example, the display element $D_{22}$) of the display array assembly 110 and components of the backplate 120. In the illustrated implementation, the second interconnect 124 is formed through the via 160, and electrically couples the drain 84 of the transistor 80 to the display array assembly 110. The backplate 120 also can include one or more insulating layers 129 that electrically insulate the foregoing components of the driving circuit array 200.

The optical stack 16 of FIG. 3 is illustrated as three layers, a top dielectric layer described above, a middle partially reflective layer (such as chromium) also described above, and a lower layer including a transparent conductor (such as indium-tin-oxide (ITO)). The common electrode is formed by the ITO layer and can be coupled to ground at the periphery of the display. In some implementations, the optical stack 16 can include more or fewer layers. For example, in some implementations, the optical stack 16 can include one or more insulating or dielectric layers covering one or more conductive layers or a combined conductive/absorptive layer.

Figure 4:
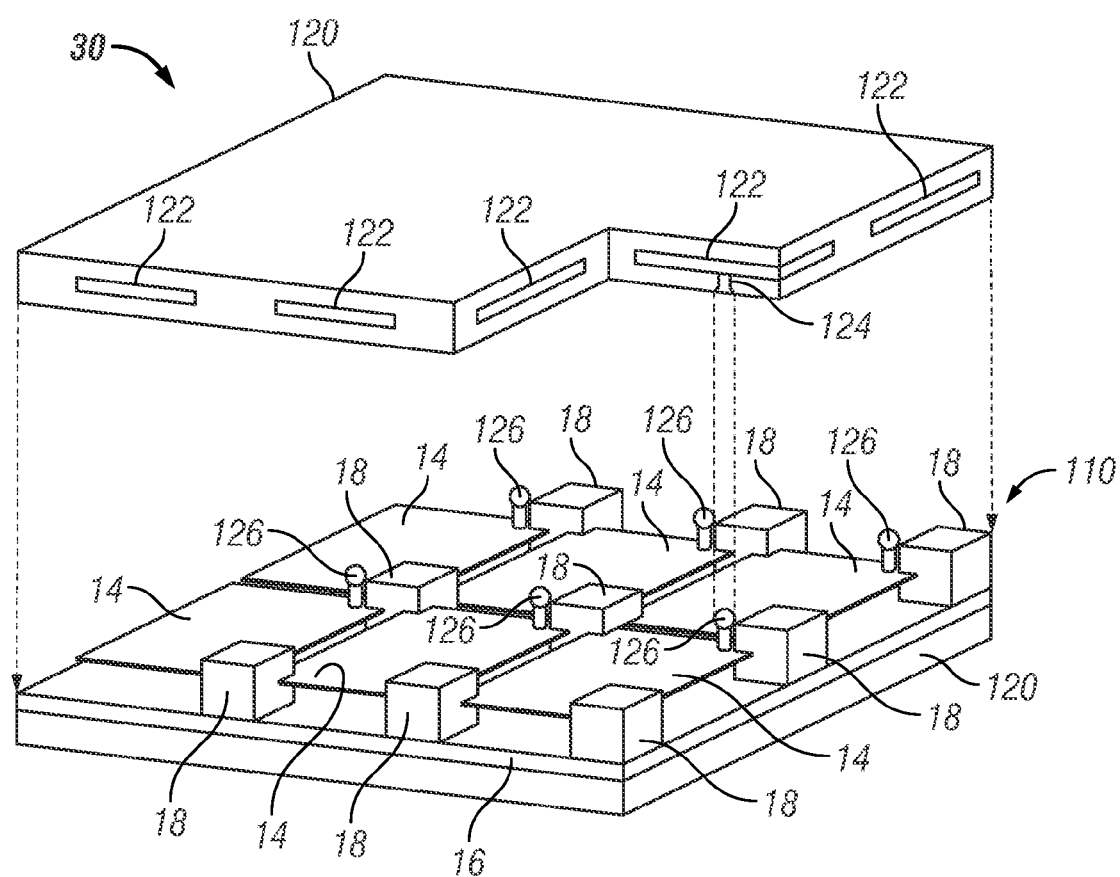
FIG. 4 is an example of a schematic exploded partial perspective view of an optical MEMS display device having an interferometric modulator array and a backplate with embedded circuitry.

FIG. 4 is an example of a schematic exploded partial perspective view of an optical MEMS display device 30 having an interferometric modulator array and a backplate with embedded circuitry. The display device 30 includes a display array assembly 110 and a backplate 120. In some implementations, the display array assembly 110 and the backplate 120 can be separately pre-formed before being attached together. In some other implementations, the display device 30 can be fabricated in any suitable manner, such as, by forming components of the backplate 120 over the display array assembly 110 by deposition.

The display array assembly 110 can include a front substrate 20, an optical stack 16, supports 18, a movable reflective layer 14, and interconnects 126. The backplate 120 can include backplate components 122 at least partially embedded therein, and one or more backplate interconnects 124.

The optical stack 16 of the display array assembly 110 can be a substantially continuous layer covering at least the array region of the front substrate 20. The optical stack 16 can include a substantially transparent conductive layer that is electrically connected to ground. The reflective layers 14 can be separate from one another and can have, e.g., a square or rectangular shape. The movable reflective layers 14 can be arranged in a matrix form such that each of the movable reflective layers 14 can form part of a display element. In the implementation illustrated in FIG. 4, the movable reflective layers 14 are supported by the supports 18 at four corners.

Each of the interconnects 126 of the display array assembly 110 serves to electrically couple a respective one of the movable reflective layers 14 to one or more backplate components 122 (e.g., transistors S and/or other circuit elements). In the illustrated implementation, the interconnects 126 of the display array assembly 110 extend from the movable reflective layers 14, and are positioned to contact the backplate interconnects 124. In another implementation, the interconnects 126 of the display array assembly 110 can be at least partially embedded in the supports 18 while being exposed through top surfaces of the supports 18. In such an implementation, the backplate interconnects 124 can be positioned to contact exposed portions of the interconnects 126 of the display array assembly 110. In yet another implementation, the backplate interconnects 124 can extend from the backplate 120 toward the movable reflective layers 14 so as to contact and thereby electrically connect to the movable reflective layers 14.

The interferometric modulators described above have been described as bi-stable elements having at least first and second states, which in these implementations include a relaxed state and an actuated state. The above and following description, however, also may be used with analog interferometric modulators having a range of states. For example, an analog interferometric modulator can have a red state, a green state, a blue state, a black state and a white state in addition to other color states Accordingly, a single interferometric modulator can be configured to have various states with different light reflectance properties over a wide range of the optical spectrum.

For the bistable display elements described above, the state of the display element is dependent on the charge on the device. Furthermore, the capacitance of the device is not constant, but can change by a factor of 5 or more, sometimes a factor of 10 or more depending on the state of the device, from a few picofarads to dozens of picofarads, for example, since the two electrodes change their relative separation with different states. Because Q=CV, a given charge can be placed on the display element with a lower input voltage when the device is in a high capacitance state. The implementations described below place some charge on the display elements to be written using the row lines to place the elements in a state having a higher capacitance relative to at least one other state (which may be referred to as a "high capacitance state") prior to writing to the display element with the data lines.

Figure 5:
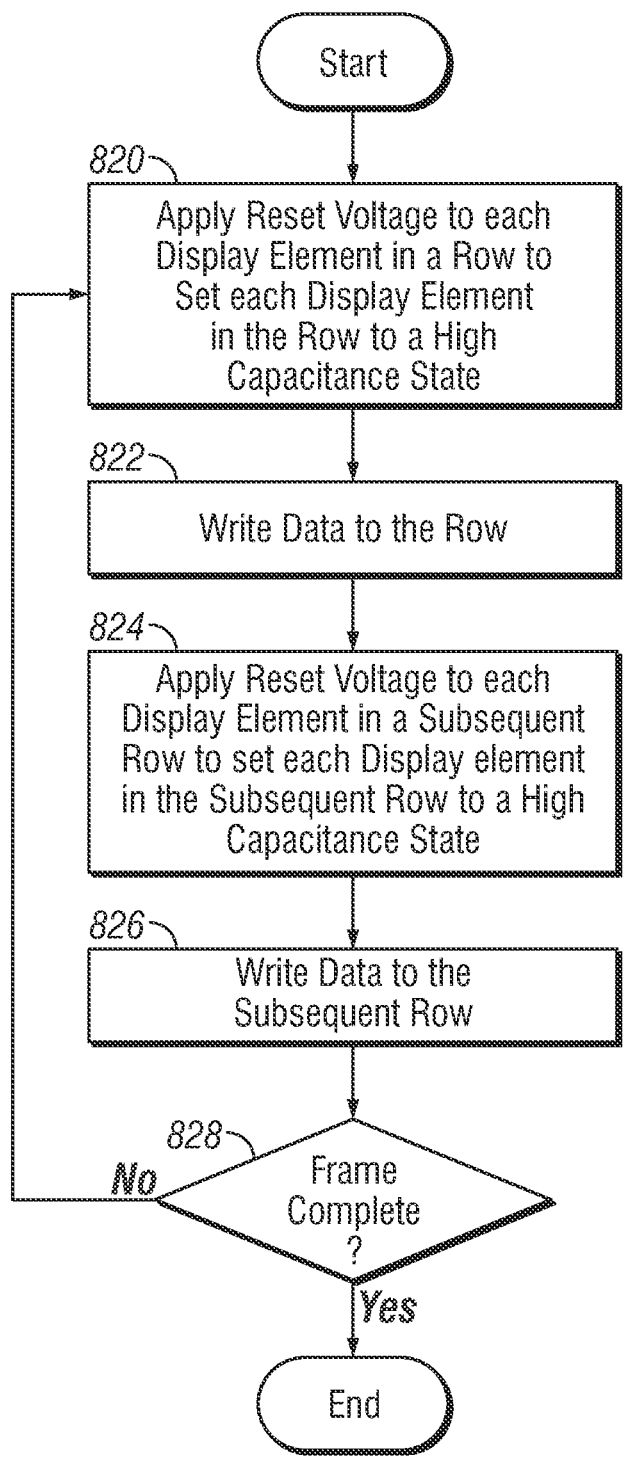
FIG. 5 is a flowchart of a process of addressing an array of interferometric modulators according to one implementation.

The flowchart of FIG. 5 illustrates this process, where FIG. 5 is a flowchart of a process of addressing an array of interferometric modulators according to one implementation. Referring now to FIG. 5, at block 820, a reset voltage is applied to each display element in a row to set each display element in the row to a high capacitance state. At block 822, the image data is written to that row. At block 824, a reset voltage is applied to each display element in a subsequent row to set each display element in the subsequent row to a high capacitance state. At block 826, the image data is written to the subsequent row. As shown at block 828, this process is continued until all the desired rows of the frame are written. As is explained further below, blocks 822 and 824 can overlap in time.

It will be appreciated that the data writing process which occurs after the display elements are placed in a high capacitance state may change their states from the high capacitance state to a lower capacitance state. To achieve the power savings, the display elements may remain in a relatively high capacitance state during most or all of the data writing period when charge is being added or removed from the display element. For electromechanical display elements such as those described above, this will be the case, as the mechanical response time of these elements can often be much slower than the time required for the charge transfer during data writing.

Figure 6A:
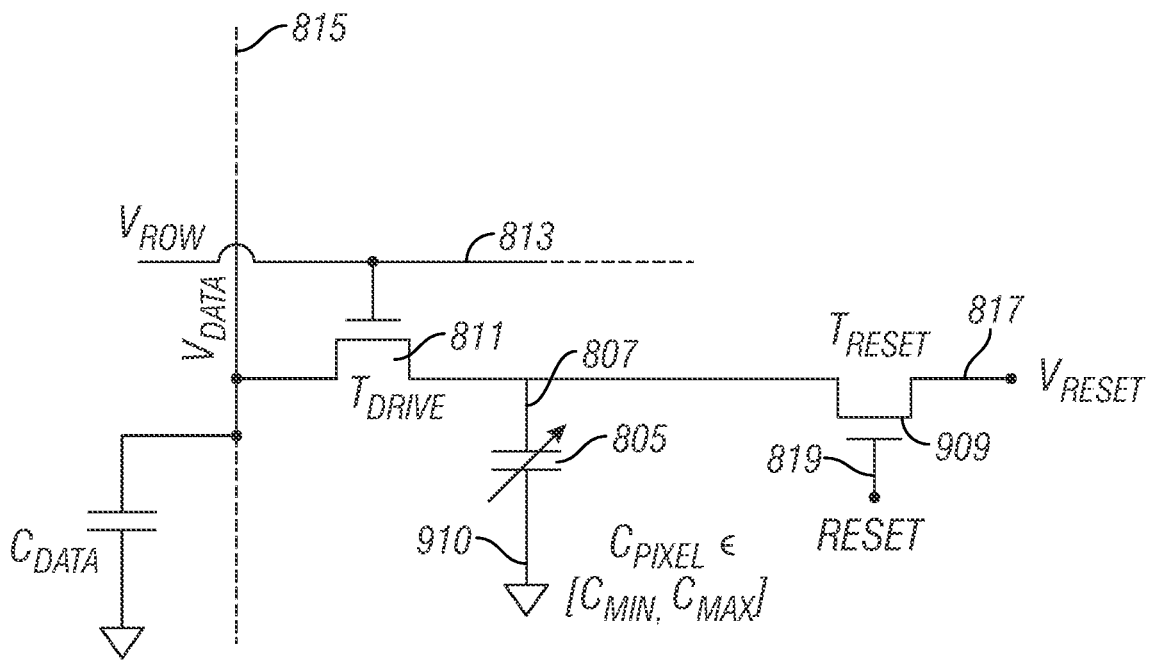
FIG. 6A is a representative circuit diagram illustrating a display element coupled to driving circuitry.

Each of FIGS. 6A-6D is an alternative circuit diagram illustrating examples of a display element coupled to driving circuitry. These circuits can implement one example of a process as shown in FIG. 5. FIG. 6A is a representative circuit diagram illustrating an example of a display element coupled to driving circuitry. As shown in FIG. 6A, a second terminal 910 of the display element 805 is coupled to ground. Further, the first terminal 807 is selectively coupled to the column line 815 by the switch 811. As discussed above with respect to FIG. 2, the switch 811 may be controlled by a signal sent on row line 813. Accordingly, the display element 805 may be driven by a voltage sent on column line 815 when coupled to the column line 815 as row line 813 is asserted.

The first terminal 807 of the column line 815 may also be selectively coupled to a reset voltage by the switch 909. The switch 909 may be controlled, for example, by a reset signal that opens and closes the switch 909. The reset signal may be sent along a reset line 819. The reset signal may be sent by, for example, gate driver 220 of FIG. 2. Accordingly, the display element 805 may receive a voltage of $V_{reset}$ when switch 909 is closed. This may be used to reset the state of the display element 805 to a high capacitance state. In one implementation, the reset voltage input line 817 is common to all display elements 805 in the same array. In some other implementations described further below, the reset voltage input line 817 is common to all display elements 805 in the same row.

Figure 6B:
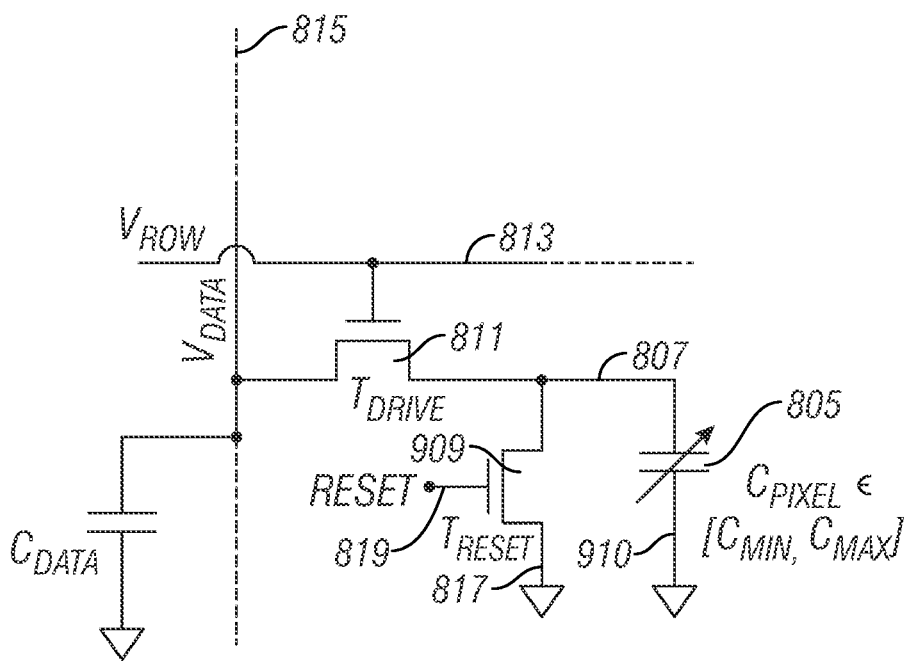
FIG. 6B is analternative circuit diagram illustrating a display element coupled to driving circuitry.

FIG. 6B is an alternative circuit diagram illustrating a display element coupled to driving circuitry. FIG. 6B is similar to FIG. 6A. However, instead of switch 909 selectively coupling the first terminal 807 to $V_{reset}$, the switch 909 selectively couples the first terminal 807 to ground. Accordingly, the display element 805 may receive ground voltage when switch 909 is closed. This may be used to reset the state of the display element to a high capacitance state in those cases where the display element is placed in a high capacitance state by having both sides grounded. This is not the case for the interferometric modulator designs described in detail above, but can be true for other display element designs with state dependent capacitance.

Figure 6C:
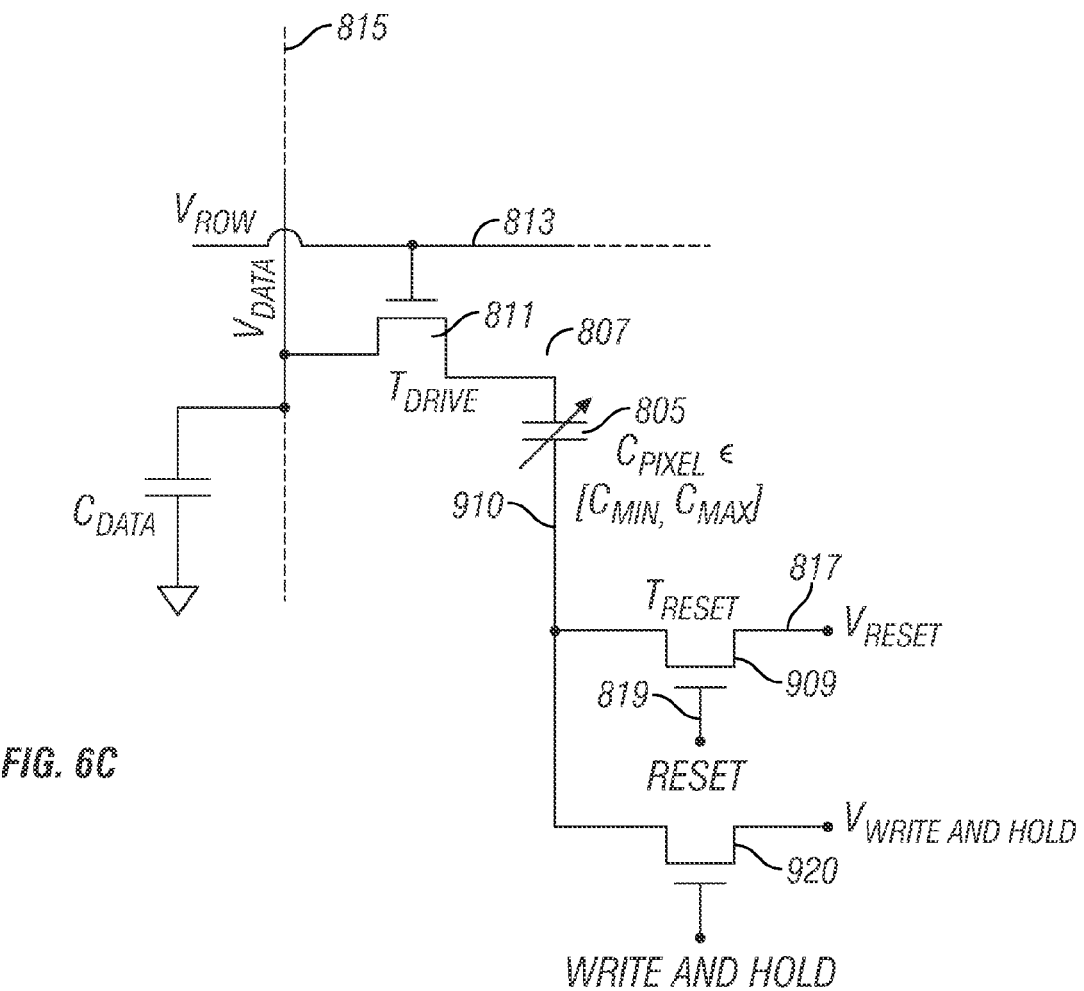
FIG. 6C is an alternative circuit diagram illustrating a display element coupled to driving circuitry.

It is also possible to reset the display element to a high capacitance state by controlling the voltage on the other side of the display element that is connected to line 910. FIG. 6C is an alternative circuit diagram illustrating a display element coupled to driving circuitry. As shown in FIG. 6C, the first terminal 807 is selectively coupled to the column line 815 by the switch 811. The switch 811 may be controlled by a signal sent on row line 813. Further, the second terminal 910 of the display element 805 is selectively coupled to a reset voltage line by the switch 909. In one implementation, the reset voltage line is common to all display elements 805 in the same row as the display element 805. Accordingly, the display element 805 may receive a voltage of the difference between the column line voltage and the reset voltage when the switches 811, 909 are closed. This may be used to reset the state of the display element 805 to a high capacitance state. During the data write and hold periods, the side of the interferometric modulator coupled to line 910 can be tied to an appropriate write and hold voltage through switch 920.

Figure 6D:
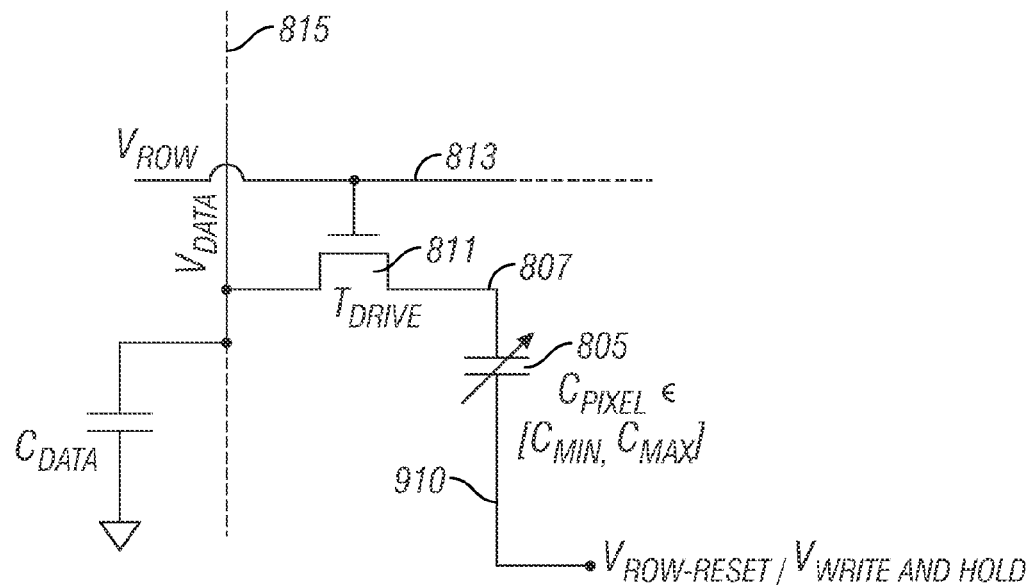
FIG. 6D is an alternative circuit diagram illustrating a display element coupled to driving circuitry.

FIG. 6D is an alternative circuit diagram illustrating another display element coupled to driving circuitry. As shown in FIG. 6D, the first terminal 807 of the display element 805 is selectively coupled to the column line 815 by the switch 811. As discussed above with respect to FIG. 2, the switch 811 may be controlled by a signal sent on row line 813. Further, the second terminal 910 of the display element 805 is coupled to a reset voltage line that may be specific for each row and is selectively applied by a gate driver (e.g. 220 of FIG. 2). Accordingly, the display element 805 may receive a voltage of the difference between the column line voltage and the reset voltage when the switch 811 is closed and the reset voltage is applied to line 910. During the data write and hold periods, the voltage applied to line 910 can transition to an appropriate write and hold voltage.

Figure 7:
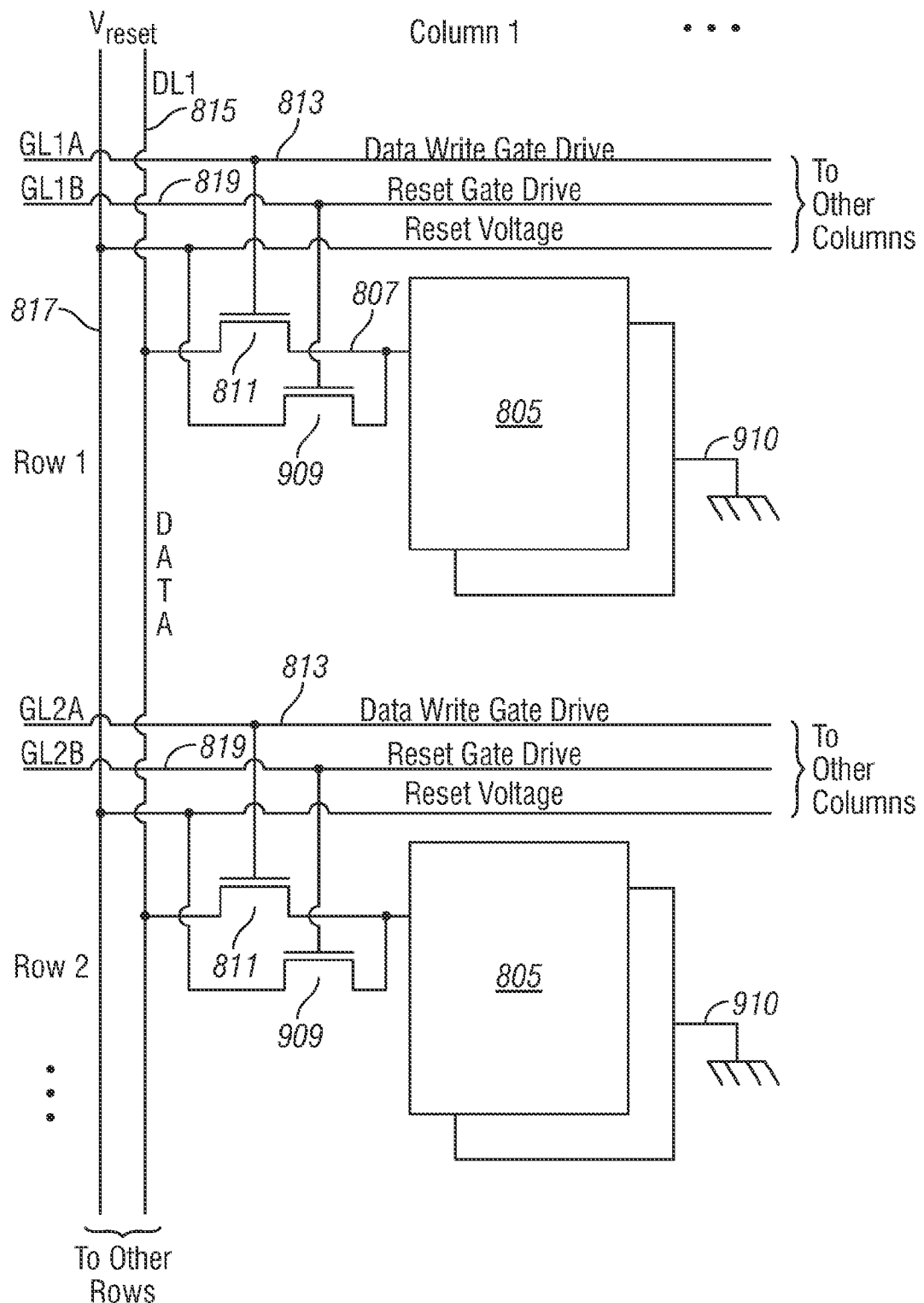
FIG. 7 is a representative circuit diagram showing the circuit of FIGS. 6A and 6B used in an array of interferometric modulators.
Figure 8:
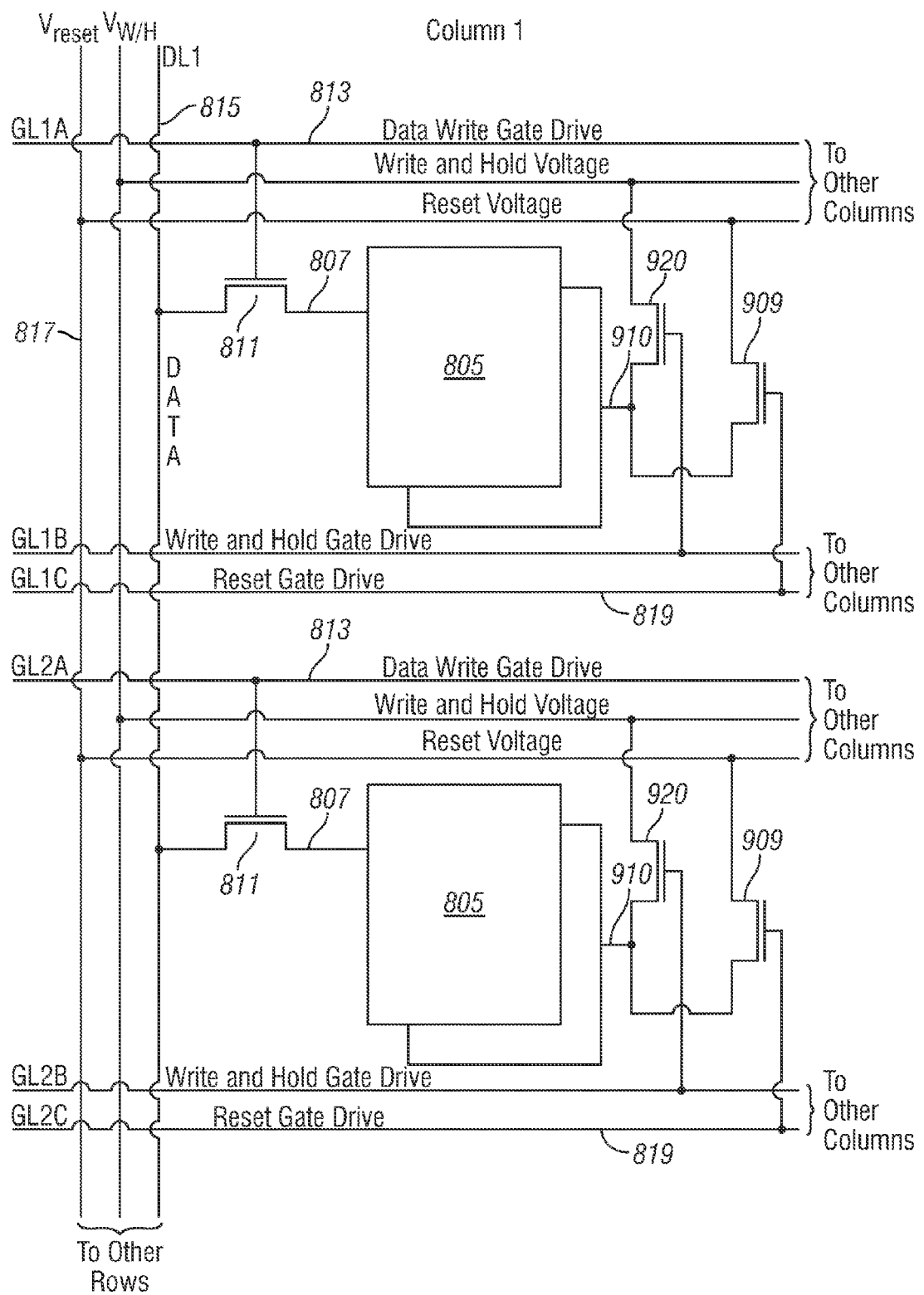
FIG. 8 is a representative circuit diagram showing the circuit of FIG. 6C used in an array of interferometric modulators.
Figure 9:
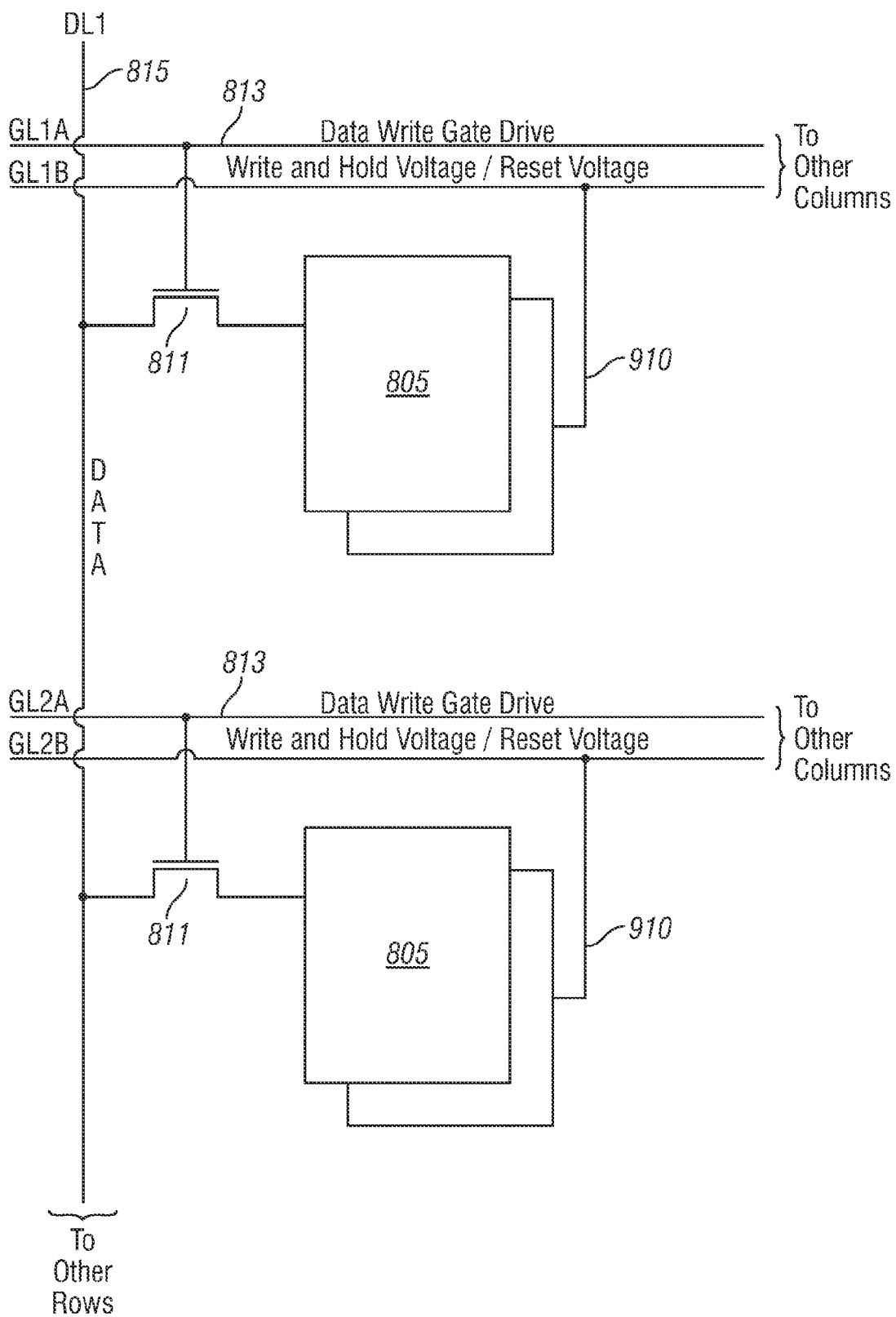
FIG. 9 is a representative circuit diagram showing the circuit of FIG. 6D used in an array of interferometric modulators.

FIGS. 7, 8, and 9 are circuit diagrams showing the individual circuits of FIGS. 6A/6B, 6C and 6D respectively, incorporated into an array of display elements, which in these Figures are interferometric modulators as described in detail above. The same designations are provided for analogous circuit elements. FIG. 7 is a representative circuit diagram showing the circuit of FIGS. 6A and 6B used in an array of interferometric modulators. In the implementation of FIG. 7, one side of switch 909 is coupled to a voltage supply of $V_{reset}$ on line 817 while the other side of switch 909 is coupled to line 807. The voltage $V_{reset}$ may not be switched, and can be a constant voltage continuously applied to switches 909 in all rows. The gate of switch 909 is driven by a reset gate drive GL1B, 819 that connects to the row driver (e.g. circuit 220 of FIG. 2) along with the data write gate drive line GL1A, 813. The transistor 909 and additional voltage and drive lines can be incorporated into the back plate as described above with the main write transistor 811. In operation, gate line GL1B can be first asserted, applying the reset voltage to the display element 805 and setting all the display elements in that row to a high capacitance state. Then, gate line GL1B can be de-asserted, the data lines for that row are placed in the appropriate states for the image data of that row, and the data can be written by asserting gate line GL1A. Because the display elements are already in a high capacitance state, the data voltages applied to data lines DL1-DLN can be much lower than otherwise possible, resulting in significant power savings. As noted above with respect to FIGS. 6A and 6B, the voltage $V_{reset}$ can be any suitable voltage for the display elements involved, including ground voltage where appropriate for the nature of the display element.

FIG. 8 is a representative circuit diagram showing the circuit of FIG. 6C used in an array of interferometric modulators. In this implementation, the reset voltage $V_{reset}$ is applied to the line 910 instead of line 807 on the other side of the display element. A second switch 920 is used to apply the appropriate voltage (e.g. ground voltage) to line 910 during the write operation, and possibly also after the row is written during data hold periods. In this implementation, the reset voltage is applied by closing both switches 811 and 909, typically at the same time that a previous row or rows are being written to, as described further below. Although the voltage on the data lines DL1-DLN could be changing during this period, the reset voltage can be selected to reset the display element even with this potential variation on the other side of the display element. For example, if the interferometric modulator actuates at 10 volts or more, and releases at 2 volts or less, then the data voltages applied to DL1 (line 815) can be 0 or +10V depending on the desired state after writing, the write voltage applied to the other side of the modulators from line 819 during write periods could be 0 volts, and the reset voltage on line 817 can be set to −10 V. In this case, regardless of the state of DL1 during a simultaneous data write cycle of a previous row, the interferometric modulator in the subsequent row being reset will be actuated to a high capacitance state during the reset cycle since the voltage across the modulators of the row being reset will be either 10 or 20 volts. For the display elements described in detail above, the transistors 920 and 909 can again be incorporated into the back plate, and the line 910 can be routed to the front panel in or on the support posts 18, for example. Alternatively, this circuitry could be deposited directly onto appropriate areas of the front panel.

FIG. 9 is a representative circuit diagram showing the circuit of FIG. 6D used in an array of interferometric modulators. In this implementation, the transistors 909 and 920 of FIG. 8 are eliminated, and a row line GL1B can be switched at the row driver circuit (e.g. gate driver 220 of FIG. 2) to output either the reset voltage during the reset period and the write and hold voltage at write and hold periods for the row.

Figure 10:
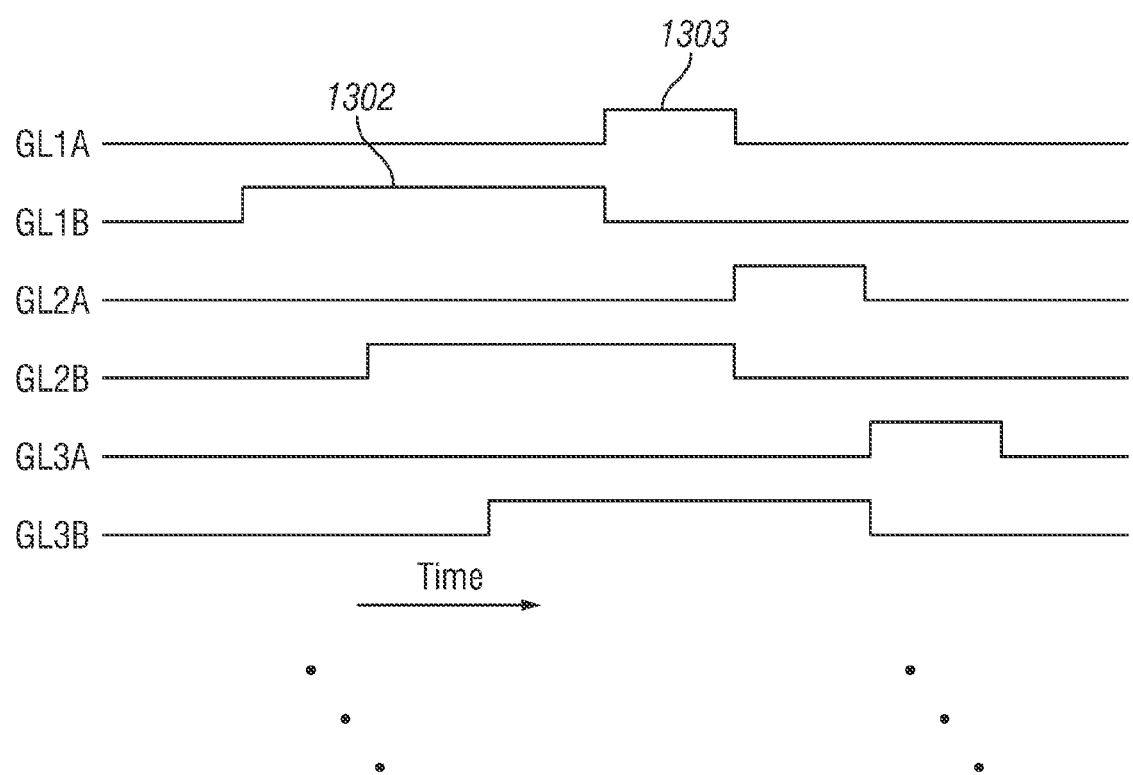
FIG. 10 is an timing diagram for addressing the array of interferometric modulators shown in FIG. 7 according to the processes shown in FIG. 5.

FIG. 10 is a timing diagram for addressing an array of interferometric modulators shown in FIG. 7 according to the processes shown in FIG. 5. In the implementation of FIG. 10, each of the interferometric modulators 805 are set to a desired high capacitance reset state during the first time period 1302. As shown, each interferometric modulators 805 in a row is set to this state by asserting GL1B, GL2B, GL3B etc. for the first time period 1302 (e.g., mechanical response time) sufficient to set the state of the interferometric modulators 805 on a row by row basis. Following this, the data on the column lines DL1-DLN is set for the row, and the write switch is closed by asserting gate lines GL1A, GL2A, GL3A, etc. for a time period 1303 to set each interferometric modulator 805 in the respective row to a desired data state. Because the mechanical response time for resetting is typically long compared to the time needed to set the final charge state during the write process, the time period 1302 may be longer than the time period 1303. Accordingly, the period of time during which the reset voltage is applied to each row may overlap the write periods for a number of preceeding rows (e.g., 2 or 3 rows). This allows a "pipelining" of the reset and write periods where as row N is being written, row N+1 and/or N+2, and/or N+3, etc. can be undergoing the reset process. This allows faster frame updates than would be the case if each row was first reset and then written before moving on to reset and write the following row.

Figure 11A:
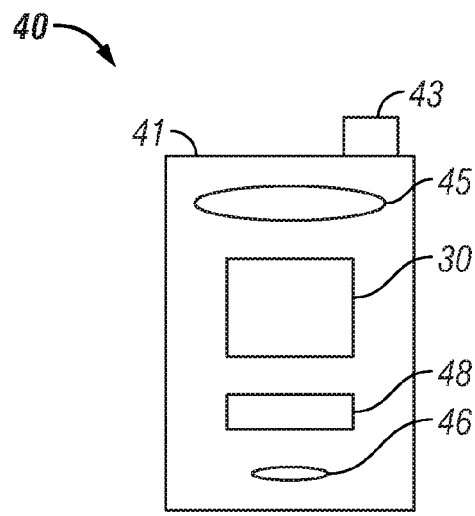
FIGS. 11A and 11B show examples of system block diagrams illustrating a display device that includes a plurality of interferometric modulators.
Figure 11B:
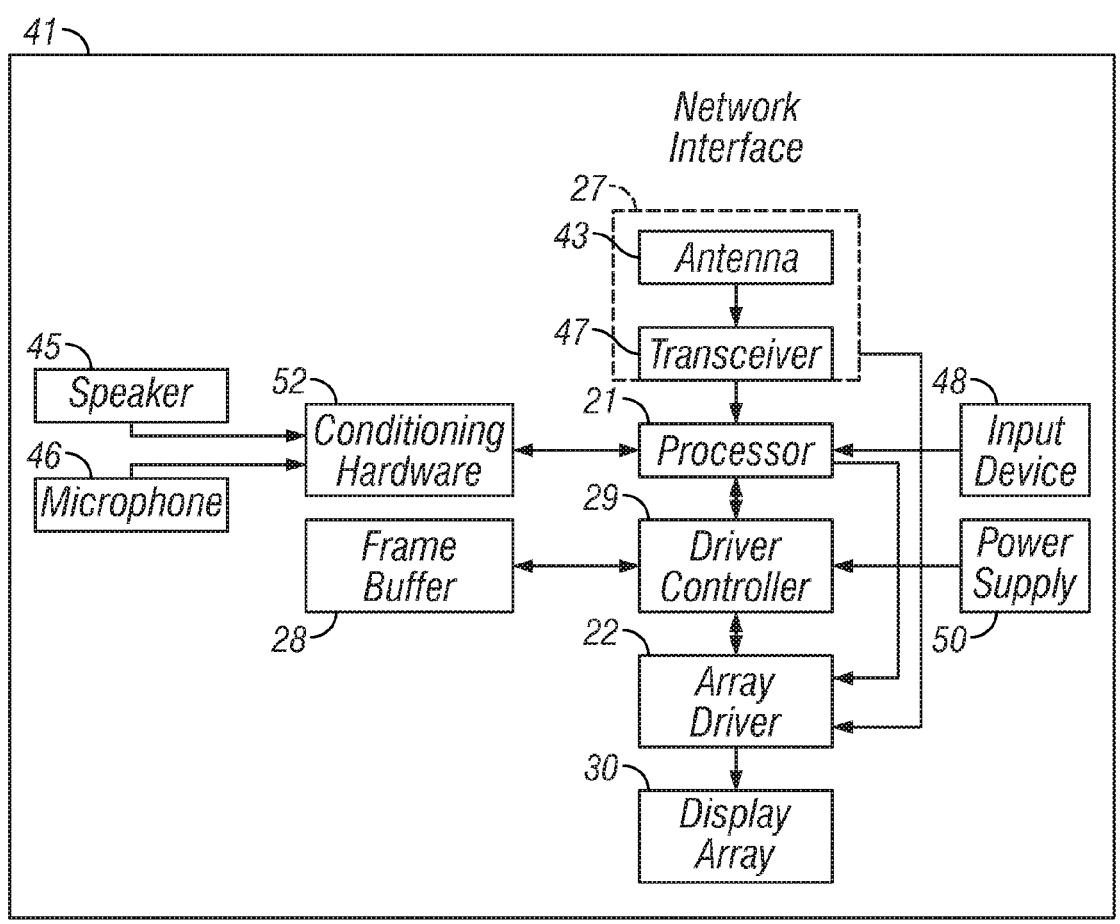

FIGS. 11A and 11B show examples of system block diagrams illustrating a display device 40 that includes a plurality of interferometric modulators. The display device 40 can be, for example, a cellular or mobile telephone. However, the same components of the display device 40 or slight variations thereof are also illustrative of various types of display devices such as televisions, e-readers and portable media players.

The display device 40 includes a housing 41, a display 30, an antenna 43, a speaker 45, an input device 48, and a microphone 46. The housing 41 can be formed from any of a variety of manufacturing processes, including injection molding, and vacuum forming. In addition, the housing 41 may be made from any of a variety of materials, including, but not limited to: plastic, metal, glass, rubber, and ceramic, or a combination thereof. The housing 41 can include removable portions (not shown) that may be interchanged with other removable portions of different color, or containing different logos, pictures, or symbols.

The display 30 may be any of a variety of displays, including a bi-stable or analog display, as described herein. The display 30 also can be configured to include a flat-panel display, such as plasma, EL, OLED, STN LCD, or TFT LCD, or a non-flat-panel display, such as a CRT or other tube device. In addition, the display 30 can include an interferometric modulator display, as described herein.

The components of the display device 40 are schematically illustrated in FIG. 11B. The display device 40 includes a housing 41 and can include additional components at least partially enclosed therein. For example, the display device 40 includes a network interface 27 that includes an antenna 43 which is coupled to a transceiver 47. The transceiver 47 is connected to a processor 21, which is connected to conditioning hardware 52. The conditioning hardware 52 may be configured to condition a signal (e.g., filter a signal). The conditioning hardware 52 is connected to a speaker 45 and a microphone 46. The processor 21 is also connected to an input device 48 and a driver controller 29. The driver controller 29 is coupled to a frame buffer 28, and to an array driver 22, which in turn is coupled to a display array 30. A power supply 50 can provide power to all components as required by the particular display device 40 design.

The network interface 27 includes the antenna 43 and the transceiver 47 so that the display device 40 can communicate with one or more devices over a network. The network interface 27 also may have some processing capabilities to relieve, e.g., data processing requirements of the processor 21. The antenna 43 can transmit and receive signals. In some implementations, the antenna 43 transmits and receives RF signals according to the IEEE 16.11 standard, including IEEE 16.11 (a), (b), or (g), or the IEEE 802.11 standard, including IEEE 802.11a, b, g or n. In some other implementations, the antenna 43 transmits and receives RF signals according to the BLUETOOTH standard. In the case of a cellular telephone, the antenna 43 is designed to receive code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1xEV-DO, EV-DO Rev A, EV-DO Rev B, High Speed Packet Access (HSPA), High Speed Downlink Packet Access (HSDPA), High Speed Uplink Packet Access (HSDPA), Evolved High Speed Packet Access (HSPA+), Long Term Evolution (LTE), AMPS, or other known signals that are used to communicate within a wireless network, such as a system utilizing 3G or 4G technology. The transceiver 47 can pre-process the signals received from the antenna 43, so that they may be received by and further manipulated by the processor 21. The transceiver 47 also can process signals received from the processor 21 so that they may be transmitted from the display device 40 via the antenna 43.

In some implementations, the transceiver 47 can be replaced by a receiver. In addition, the network interface 27 can be replaced by an image source, which can store or generate image data to be sent to the processor 21. The processor 21 can control the overall operation of the display device 40. The processor 21 receives data, such as compressed image data from the network interface 27 or an image source, and processes the data into raw image data or into a format that is readily processed into raw image data. The processor 21 can send the processed data to the driver controller 29 or to the frame buffer 28 for storage. Raw data typically refers to the information that identifies the image characteristics at each location within an image. For example, such image characteristics can include color, saturation, and gray-scale level.

The processor 21 can include a microcontroller, CPU, or logic unit to control operation of the display device 40. The conditioning hardware 52 may include amplifiers and filters for transmitting signals to the speaker 45, and for receiving signals from the microphone 46. The conditioning hardware 52 may be discrete components within the display device 40, or may be incorporated within the processor 21 or other components.

The driver controller 29 can take the raw image data generated by the processor 21 either directly from the processor 21 or from the frame buffer 28 and can re-format the raw image data appropriately for high speed transmission to the array driver 22. In some implementations, the driver controller 29 can re-format the raw image data into a data flow having a raster-like format, such that it has a time order suitable for scanning across the display array 30. Then the driver controller 29 sends the formatted information to the array driver 22. Although a driver controller 29, such as an LCD controller, is often associated with the system processor 21 as a stand-alone Integrated Circuit (IC), such controllers may be implemented in many ways. For example, controllers may be embedded in the processor 21 as hardware, embedded in the processor 21 as software, or fully integrated in hardware with the array driver 22.

The array driver 22 can receive the formatted information from the driver controller 29 and can re-format the video data into a parallel set of waveforms that are applied many times per second to the hundreds, and sometimes thousands (or more), of leads coming from the display's x-y matrix of pixels.

In some implementations, the driver controller 29, the array driver 22, and the display array 30 are appropriate for any of the types of displays described herein. For example, the driver controller 29 can be a conventional display controller or a bi-stable display controller (e.g., an IMOD controller). Additionally, the array driver 22 can be a conventional driver or a bi-stable display driver (e.g., an IMOD display driver). Moreover, the display array 30 can be a conventional display array or a bi-stable display array (e.g., a display including an array of IMODs). In some implementations, the driver controller 29 can be integrated with the array driver 22. Such an implementation is common in highly integrated systems such as cellular phones, watches and other small-area displays.

In some implementations, the input device 48 can be configured to allow, e.g., a user to control the operation of the display device 40. The input device 48 can include a keypad, such as a QWERTY keyboard or a telephone keypad, a button, a switch, a rocker, a touch-sensitive screen, or a pressure- or heat-sensitive membrane. The microphone 46 can be configured as an input device for the display device 40. In some implementations, voice commands through the microphone 46 can be used for controlling operations of the display device 40.

The power supply 50 can include a variety of energy storage devices as are well known in the art. For example, the power supply 50 can be a rechargeable battery, such as a nickel-cadmium battery or a lithium-ion battery. The power supply 50 also can be a renewable energy source, a capacitor, or a solar cell, including a plastic solar cell or solar-cell paint. The power supply 50 also can be configured to receive power from a wall outlet.

In some implementations, control programmability resides in the driver controller 29 which can be located in several places in the electronic display system. In some other implementations, control programmability resides in the array driver 22. The above-described optimization may be implemented in any number of hardware and/or software components and in various configurations.

Figure 12:
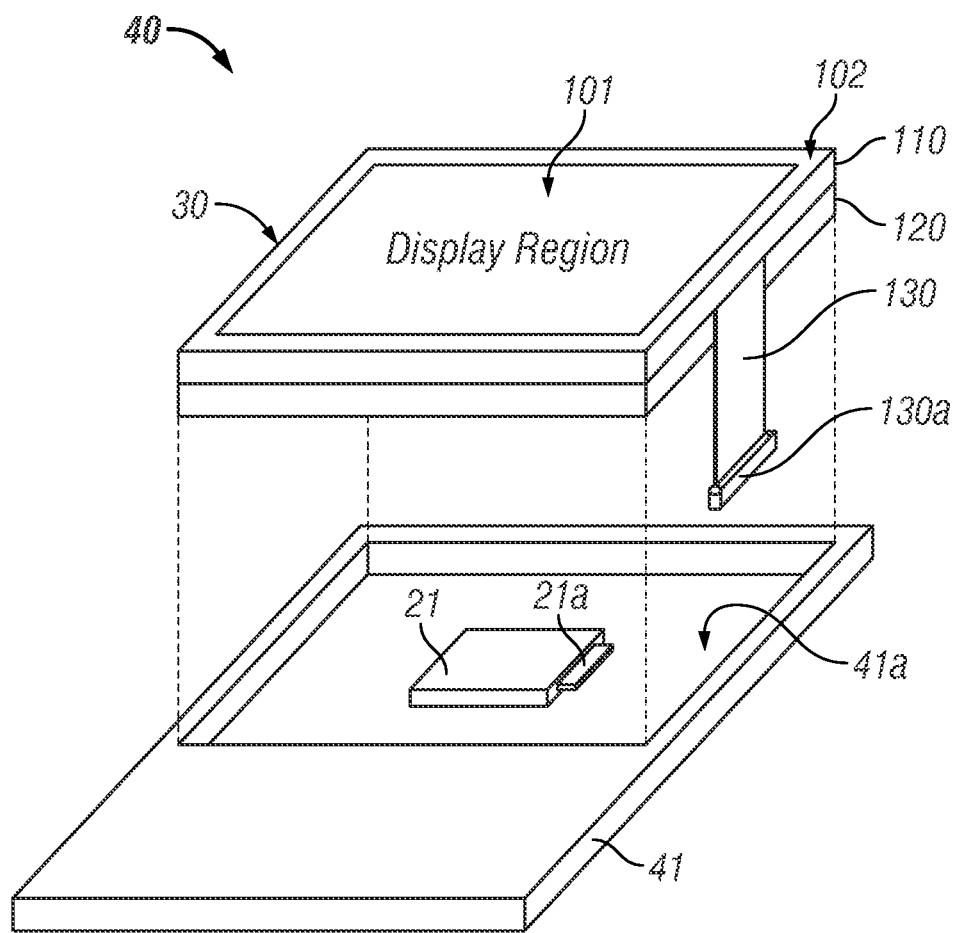
FIG. 12 is an example of a schematic exploded perspective view of an electronic device having an optical MEMS display.

FIG. 12 is an example of a schematic exploded perspective view of the electronic device 40 of FIGS. 11 A and 11B according to one implementation. The illustrated electronic device 40 includes a housing 41 that has a recess 41a for a display array 30. The electronic device 40 also includes a processor 21 on the bottom of the recess 41a of the housing 41. The processor 21 can include a connector 21a for data communication with the display array 30. The electronic device 40 also can include other components, at least a portion of which is inside the housing 41. The other components can include, but are not limited to, a networking interface, a driver controller, an input device, a power supply, conditioning hardware, a frame buffer, a speaker, and a microphone, as described earlier in connection with FIG. 11B.

The display array 30 can include a display array assembly 110, a backplate 120, and a flexible electrical cable 130. The display array assembly 110 and the backplate 120 can be attached to each other, using, for example, a sealant.

The display array assembly 110 can include a display region 101 and a peripheral region 102. The peripheral region 102 surrounds the display region 101 when viewed from above the display array assembly 110. The display array assembly 110 also includes an array of display elements positioned and oriented to display images through the display region 101. The display elements can be arranged in a matrix form. In some implementations, each of the display elements can be an interferometric modulator. Also, in some implementations, the term "display element" may be referred to as a "pixel."

The backplate 120 may cover substantially the entire back surface of the display array assembly 110. The backplate 120 can be formed from, for example, glass, a polymeric material, a metallic material, a ceramic material, a semiconductor material, or a combination of two or more of the foregoing materials, in addition to other similar materials. The backplate 120 can include one or more layers of the same or different materials. The backplate 120 also can include various components at least partially embedded therein or mounted thereon. Examples of such components include, but are not limited to, a driver controller, array drivers (for example, a data driver and a scan driver), routing lines (for example, data lines and gate lines), switching circuits, processors (for example, an image data processing processor) and interconnects.

The flexible electrical cable 130 serves to provide data communication channels between the display array 30 and other components (for example, the processor 21) of the electronic device 40. The flexible electrical cable 130 can extend from one or more components of the display array assembly 110, or from the backplate 120. The flexible electrical cable 130 can include a plurality of conductive wires extending parallel to one another, and a connector 130a that can be connected to the connector 21a of the processor 21 or any other component of the electronic device 40.

The various illustrative logics, logical blocks, modules, circuits and algorithm steps described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and steps described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. In some implementations, particular steps and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The steps of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the disclosure is not intended to be limited to the implementations shown herein, but is to be accorded the widest scope consistent with the claims, the principles and the novel features disclosed herein. Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of the IMOD as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. An apparatus comprising:
   at least one display element having a plurality of display states, each of the display states corresponding to one of a plurality of charge levels applied to the at least one display element, the plurality of display states including a least a first higher capacitance display state and a second display state, wherein the capacitance of the display element is higher in the first higher capacitance display state than in the second display state;
   a drive switch coupling the at least one display element to a drive voltage line when addressed by a drive address line; and
   a reset switch coupling the at least one display element to a reset voltage line when addressed by a reset address line;
   wherein the reset voltage line is configured to set the at least one display element to the first higher capacitance display state when coupled to the at least one display element.

2. The apparatus of claim 1, wherein the drive voltage line is coupled to one or more columns of display elements.

3. The apparatus of claim 2, wherein the drive address line is coupled to one or more rows of display elements.

4. The apparatus of claim 3, further including an address line driver selectively coupled to one or both of the drive address line and the reset address line.

5. The apparatus of claim 4, wherein the at least one display element includes a bistable display element.

6. The apparatus of claim 5, wherein the bistable display element includes an interferometric modulator.

7. The apparatus of claim 1, wherein the first higher capacitance display state has a capacitance of five or more times the capacitance of the second display state.

8. The apparatus of claim 1, wherein the first higher capacitance display state has a capacitance of ten or more times the capacitance of the second display state.

9. A method of updating an array including at least one display element, the method comprising:
   coupling the at least one display element to a reset voltage line, the at least one display element having at least a first and a second display state, wherein the capacitance of the at least one display element is higher in the first higher capacitance display state than in the second display state;
   setting the at least one display element to the first higher capacitance display state;
   decoupling the at least one display element from the reset voltage line;
   coupling the at least one display element to a drive voltage line; and
   driving the at least one display element to the second display state.

10. The method of claim 9, wherein the array includes one or more rows of display elements and one or more columns of display elements, wherein each of the one or more columns of display elements is associated with a respective drive voltage line, and wherein each display element in each of the one or more rows of display elements is selectively coupled to its respective drive voltage line by a respective drive address line.

11. The method of claim 10, wherein each of the one or more rows of display elements is associated with a respective reset voltage line, and wherein each display element in each of the one or more rows of display elements is selectively coupled to its respective reset voltage line by a respective reset address line.

12. The method of claim 11, wherein coupling the at least one display element to the drive voltage line includes coupling only the display elements of one row to their respective drive voltage lines at one time.

13. The method of claim 12, wherein coupling the at least one display element to a reset voltage line includes coupling the display elements of a first row to their respective reset voltage lines while coupling the display elements of a second row to their respective drive voltage lines.

14. The method of claim 9, wherein the at least one display element includes a bistable display element.

15. The method of claim 14, wherein the bistable display element includes an interferometric modulator.

16. A method of updating an array including at least one row of display elements, the method comprising:
pre-charging at least one row of display elements with a reset voltage, the display elements of the at least one row having at least a first and a second display state, wherein the capacitance of the display elements of the at least one row is higher in the first higher capacitance display state than in the second display state;
waiting for at least some of the display elements in the at least one row of display elements to reach the first higher capacitance display state;
charging the at least one row of display elements with a drive voltage; and
waiting for at least some of the display elements in the at least one row of display elements to reach the second display state.

17. The method of claim 16, wherein the at least one row of display elements includes one or more bistable display element.

18. The apparatus of claim 17, wherein the one or more bistable display elements include interferometric modulators.

19. An apparatus comprising:
at least one display element having a plurality of display states, each of the display states corresponding to one of a plurality of charge levels applied to the at least one display element, the plurality of display states including a least a first higher capacitance display state and a second display state, wherein the capacitance of the display element is higher in the first higher capacitance display state than in the second display state;
means for coupling the at least one display element to a drive voltage line when addressed by a drive address line;
means for coupling the at least one display element to a reset voltage line; and
means for setting the at least one display element to the first higher capacitance display state.

20. The apparatus of claim 19, wherein the apparatus includes an array of one or more rows of display elements and one or more columns of display elements, wherein each of the one or more columns of display elements is associated with a respective drive voltage line, and wherein each display element in each of the one or more rows of display elements is selectively coupled to its respective drive voltage line by a respective drive address line.

21. The apparatus of claim 20, wherein each of the one or more rows of display elements is associated with a respective reset voltage line, and wherein each display element in each of the one or more rows of display elements is selectively coupled to its respective reset voltage line by a respective reset address line.

22. The apparatus of claim 21, wherein the means for coupling the at least one display element to the drive voltage line includes means for coupling only the display elements of one row to their respective drive voltage lines at one time.

23. The apparatus of claim 22, wherein the means for coupling the at least one display element to a reset voltage line includes means for coupling the display elements of a first row to their respective reset voltage lines while coupling the display elements of a second row to their respective drive voltage lines.

24. The apparatus of claim 19, wherein the at least one display element includes a bistable display element.

25. The apparatus of claim 24, wherein the bistable display element includes an interferometric modulator.

26. The apparatus of claim 19, further comprising:
a display;
a processor that is configured to communicate with said display, said processor being configured to process image data; and
a memory device that is configured to communicate with said processor.

27. The apparatus as recited in claim 26, further comprising:
a driver circuit configured to send at least one signal to said display; and
a controller configured to send at least a portion of said image data to said driver circuit.

28. The apparatus as recited in claim 26, further comprising:
an image source module configured to send said image data to said processor.

29. The apparatus as recited in claim 28, wherein said image source module includes at least one of a receiver, transceiver, and transmitter.

30. The apparatus as recited in claim 26, further comprising:
an input device configured to receive input data and to communicate said input data to said processor.

31. The apparatus of claim 19, wherein the first higher capacitance display state has a capacitance of five or more times the capacitance of the second display state.

32. The apparatus of claim 19, wherein the first higher capacitance display state has a capacitance of ten or more times the capacitance of the second display state.

* * * * *